(12) United States Patent
Zhang et al.

(10) Patent No.: US 11,519,872 B2
(45) Date of Patent: Dec. 6, 2022

(54) MULTI-SCREEN SUPPORTING DEVICE IN HIGH-TEMPERATURE ADIABATIC CALORIMETER

(71) Applicant: DALIAN UNIVERSITY OF TECHNOLOGY, Liaoning (CN)

(72) Inventors: Zhenyu Zhang, Liaoning (CN); Qun Zhang, Liaoning (CN); Quan Shi, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 222 days.

(21) Appl. No.: 17/061,536

(22) Filed: Oct. 1, 2020

(65) Prior Publication Data

US 2021/0116404 A1    Apr. 22, 2021

(30) Foreign Application Priority Data

Oct. 21, 2019   (CN) .......................... 201910998904.0

(51) Int. Cl.
*G01K 17/00* (2006.01)
*G01N 25/48* (2006.01)
*G01K 17/04* (2006.01)

(52) U.S. Cl.
CPC ........... *G01N 25/482* (2013.01); *G01K 17/04* (2013.01)

(58) Field of Classification Search
CPC combination set(s) only.
See application file for complete search history.

(56) References Cited

U.S. PATENT DOCUMENTS 3,813,937 A * 6/1974 Fletcher ................. G01K 17/04
                                                374/33
4,055,982 A * 11/1977 Ter-Minassian ....... G01K 17/00
                                                374/10

FOREIGN PATENT DOCUMENTS

DE           4321688 A1 *  2/1995  ............. G01K 17/00

* cited by examiner

*Primary Examiner* — Lisa M Caputo
*Assistant Examiner* — Nasir U. Ahmed
(74) *Attorney, Agent, or Firm* — Muncy, Geissler, Olds & Lowe, P.C.

(57) ABSTRACT

The present invention discloses a multi-screen supporting device in a high-temperature adiabatic calorimeter, and belongs to a calorimeter device in calorimetry. The multi-screen supporting device comprises a vacuum tank, three layers of protecting screens, two layers of thermal insulation screens, a protecting screen supporter for supporting and fixing the protecting screens, a thermal insulation screen supporter for supporting and fixing the thermal insulation screens, and a connecting piece for connecting and fixing the protecting screen supporter and the thermal insulation screen supporter. The multi-screen supporting mode in the high-temperature calorimeter solves the problems of time consumption for disassembling and assembling, low multi-screen assembling coaxiality and reduced experimental repeatability caused by many parts moved in each disassembling and assembling in the existing high-temperature calorimeter. The multi-screen supporting mode is easy in part processing, high in disassembling and assembling efficiency and convenient in operation, and effectively improves the experimental repeatability.

1 Claim, 1 Drawing Sheet

MULTI-SCREEN SUPPORTING DEVICE IN HIGH-TEMPERATURE ADIABATIC CALORIMETER

TECHNICAL FIELD

The present invention belongs to a calorimeter device in calorimetry, and particularly relates to a mechanical supporting device with convenient disassembling and assembling, easy processing, high assembling coaxiality and improved experiment repeatability.

BACKGROUND

Heat capacity is one of the thermodynamic properties of a substance. The definition of the heat capacity of any system refers to a ratio of the heat added to the system to the temperature change caused by the system in any process. The heat capacity data obtained from experiments is mathematically processed to obtain various standard thermodynamic functions of the substance at different temperatures, such as enthalpy change, entropy change and Gibbs free energy change. Microscopic information such as the structure of the substance, the mechanism of phase change, and the purity of the substance can also be obtained through the measurement of the heat capacity. The heat capacity is also the basic thermophysical property of the material and theoretical analysis data, is widely applied in actual production and life, and has very important application value especially in the fields of energy, aerospace, substance synthesis, medicine and chemical thermodynamics. So far, adiabatic calorimetry experiment technology has been regarded as the most accurate and direct method to determine the heat capacity of the substance. Science researchers in China and abroad have also developed many precise automatic adiabatic calorimeters, but most of the adiabatic calorimeters work in the medium and low temperature ranges, and there are fewer high-temperature calorimeters. Therefore, there is more space to fill in the development and optimization of the high-temperature calorimeters.

SUMMARY

With respect to the problems of time consumption for disassembling and assembling, low coaxiality of thermal insulation screens and protecting screens and reduced experimental repeatability caused by many parts moved in each disassembling and assembling in the high-temperature adiabatic calorimeter, the present invention provides a mechanical supporting mode with convenient disassembling and assembling, easy processing, high assembling coaxiality and improved experimental repeatability.

The technical solution of the present invention is as follows:

A multi-screen supporting device in a high-temperature adiabatic calorimeter comprises a vacuum tank 1, protecting screens, a protecting screen supporter 17, thermal insulation screens, a thermal insulation screen supporter 18 and a connecting piece 9, wherein the protecting screen supporter 17 comprises a supporting tube 14, stainless steel sleeves and a third nut 10; the thermal insulation screen supporter 18 comprises a stepped supporting rod 5, a sleeve 7 and a nut 8; both ends of the supporting tube 14 have threads, the bottom end of the supporting tube 14 has a sealed thread connected with the vacuum tank 1, and the top end is in threaded connection with the connecting piece 9 and the third nut 10; a third stainless steel sleeve 13 is sleeved outside the supporting tube 14 and positioned at the bottom; a lower cover of an outer protecting screen 2 and a sleeve body penetrate into the third stainless steel sleeve 13; the third stainless steel sleeve 13 supports the outer protecting screen 2 to limit the motion and rotation of the outer protecting screen 2 along X axis and Y axis and motion along Z axis, so as to completely position the outer protecting screen 2; a second stainless steel sleeve 12 is sleeved outside the supporting tube 14 and positioned at the upper part of the third stainless steel sleeve 13; a lower cover of a middle protecting screen 3 and the sleeve body penetrate into the second stainless steel sleeve 12; the second stainless steel sleeve 12 supports the middle protecting screen 3 to limit the motion and rotation of the middle protecting screen 3 along X axis and Y axis and motion along Z axis, so as to completely position the middle protecting screen 3; a first stainless steel sleeve 11 is sleeved outside the supporting tube 14 and positioned at the upper part of the second stainless steel sleeve 12; a lower cover of an inner protecting screen 4 and the sleeve body penetrate into the first stainless steel sleeve 11; the first stainless steel sleeve 11 supports the inner protecting screen 4 to limit the motion and rotation of the inner protecting screen 4 along X axis and Y axis and motion along Z axis, so as to completely position the inner protecting screen 4; the top end of the supporting tube 14 is in threaded connection with the third nut 10; the outer protecting screen 2, the middle protecting screen 3 and the inner protecting screen 4 are fixed; the bottom end of the stepped supporting rod 5 is connected with the top end of the supporting tube 14 through the connecting piece 9; the stepped supporting rod 5 is used for supporting an outer thermal insulation screen 15 with a hole in a bottom cover to limit the motion and rotation of the outer thermal insulation screen 15 along X axis and Y axis and motion along Z axis, so as to completely position the outer thermal insulation screen 15; the second nut 8 and the stepped supporting rod 5 are in threaded connection to fix the outer thermal insulation screen 15; the top end of the stepped supporting rod 5 supports an inner thermal insulation screen 16 with a hole in a bottom cover to limit the motion and rotation of the inner thermal insulation screen 16 along X axis and Y axis and motion along Z axis, so as to completely position the inner thermal insulation screen 16; the first nut 6 and the top end of the stepped supporting rod 5 are in threaded connection to fix the inner thermal insulation screen 16; the sleeve 7 is sleeved outside the stepped supporting rod 5 between the first nut 6 and the second nut 8; the sleeve 7 prevents the second nut 8 from rotating when twisting the first nut 6 in the process of disassembling the calorimeter; meanwhile, the sleeve 7 also makes the inner thermal insulation screen 16 fixed more firmly; the inner thermal insulation screen 16, the outer thermal insulation screen 15, the inner protecting screen 4, the middle protecting screen 3 and the outer protecting screen 2 are distributed successively from inside to outside; and finally, upper covers of the inner thermal insulation screen 16, the outer thermal insulation screen 15, the inner protecting screen 4, the middle protecting screen 3 and the outer protecting screen 2 are covered to complete the assembly of a plurality of screens in the high-temperature calorimeter.

Compared with the multi-screen supporting mode in the existing high-temperature adiabatic calorimeter, the present invention provides a multi-screen supporting device in the high-temperature adiabatic calorimeter, and has the following advantages:

(1) improvement of experimental repeatability and reliability;

(2) convenient disassembling and assembling;
(3) easy processing;
(4) high assembling coaxiality.

Figure 1:
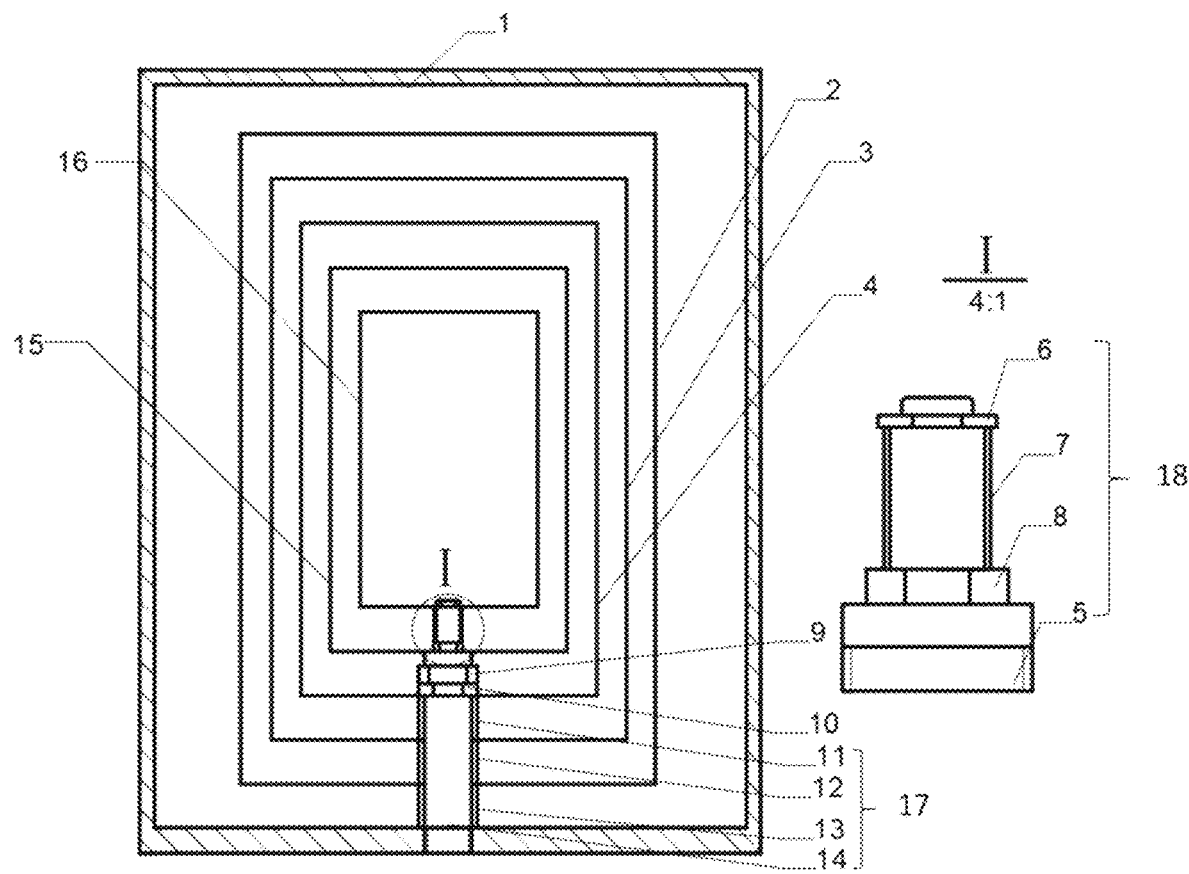
FIG. 1 is an overall structural schematic diagram of the present invention.
Figure 2:
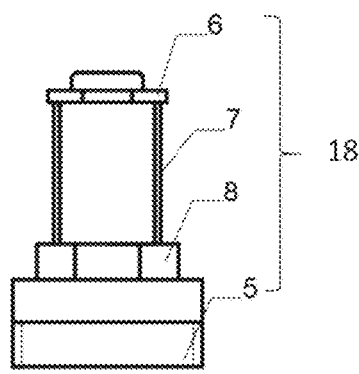
FIG. 2 is a local amplified diagram of an overall structure of the present invention.

In the figures: 1 vacuum tank; 2 outer protecting screen; 3 middle protecting screen; 4 inner protecting screen; 5 stepped supporting rod; 6 first nut; 7 sleeve; 8 second nut; 9 connecting piece; 10 third nut; 11 first stainless steel sleeve; 12 second stainless steel sleeve; 13 third stainless steel sleeve; 14 supporting tube; 15 outer thermal insulation screen; 16 inner thermal insulation screen; 17 protecting screen supporter; 18 thermal insulation screen supporter.

DETAILED DESCRIPTION

Specific embodiments of the present invention are further described below in combination with accompanying drawings and the technical solution.

Both ends of a supporting tube 14 have threads; one end of the supporting tube 14 has a sealed thread connected with a vacuum tank 1, and an ordinary fine thread on the other end is in threaded connection with a connecting piece 9 and a third nut 10. After the stainless steel tube 14 is connected with the vacuum tank 1, a third sleeve 13 penetrates into the supporting tube 14, and then a lower cover of an outer protecting screen 2 and a sleeve body penetrate into the supporting tube 14. At this moment, the third sleeve 13 supports the outer protecting screen 2 to limit the motion and rotation of the outer protecting screen 2 along X axis and Y axis and motion along Z axis, so as to completely position the outer protecting screen 2. A second sleeve 12 penetrates into the supporting tube 14, and then a lower cover of a middle protecting screen 3 and a sleeve body penetrate into the supporting tube 14. At this moment, the second sleeve 12 supports the middle protecting screen 3 to limit the motion and rotation of the middle protecting screen 3 along X axis and Y axis and motion along Z axis, so as to completely position the middle protecting screen 3. A first sleeve 11 penetrates into the supporting tube 14, and then a lower cover of an inner protecting screen 4 and a sleeve body penetrate into the supporting tube 14. At this moment, the first sleeve 11 supports the inner protecting screen 4 to limit the motion and rotation of the inner protecting screen 4 along X axis and Y axis and motion along Z axis, so as to completely position the inner protecting screen 4. The supporting tube 14 is in threaded connection with the third nut 10; and the outer protecting screen 2, the middle protecting screen 3 and the inner protecting screen 4 are fixed. The stepped supporting rod 5 is connected with the supporting tube 14 through the connecting piece 9. The stepped supporting rod 5 is used for supporting an outer thermal insulation screen 15 with a hole in a bottom cover. At this moment, the motion and rotation of the outer thermal insulation screen 15 along X axis and Y axis and motion along Z axis are limited, so as to completely position the outer thermal insulation screen 15. The second nut 8 and the stepped supporting rod 5 are in threaded connection to fix the outer thermal insulation screen 15. The stepped supporting rod 5 is used for supporting an inner thermal insulation screen 16 with a hole in a bottom cover. At this moment, the motion and rotation of the inner thermal insulation screen 16 along X axis and Y axis and motion along Z axis are limited, so as to completely position the inner thermal insulation screen 16. The first nut 6 and the stepped supporting rod 5 are in threaded connection to fix the inner thermal insulation screen 16. To prevent the second nut 8 from rotating when twisting the first nut 6 in the process of disassembling the calorimeter, a sleeve 7 is added on the nut 8 and also makes the inner thermal insulation screen 16 fixed more firmly. At this moment, the supporting and fixation of the outer thermal insulation screen 15 and the inner thermal insulation screen 16 are completed. and finally, upper covers of the inner thermal insulation screen 16, the outer thermal insulation screen 15, the inner protecting screen 4, the middle protecting screen 3 and the outer protecting screen 2 are covered to complete the assembly of a plurality of screens in the high-temperature calorimeter.

The upper covers of the outer protecting screen 2, the middle protecting screen 3, the inner protecting screen 4, the outer thermal insulation screen 15 and the inner thermal insulation screen 16 are opened successively; the first nut 6 is screwed out; the inner thermal insulation screen 16 and the sleeve 7 are taken out; the second nut 8 is screwed off; and the outer thermal insulation screen 15 is taken out. This process completes the disassembling process of the high-temperature calorimeter. Compared with the existing supporting and fixation mode, the device avoids the motion of three layers of protecting screen bodies, two layers of thermal insulation screen bodies and all the lower covers in the disassembling process; and in multiple experiments, three layers of protecting screen bodies, two layers of thermal insulation screen bodies and all the lower covers may not change the positions, thereby improving the experimental repeatability.

In the multi-screen supporting device in the high-temperature adiabatic calorimeter in the present invention, the vacuum tank 1 is made of 304 stainless steel and has outer diameter of 150-200 mm, height of 240-260 mm and wall thickness of 5-10 mm. The vacuum tank 1 has two parts: a tank body and a flange upper cover. A sealed threaded hole is formed in the center of the bottom of the tank body, and has a pitch of 1-2 mm and a number of turns of 5-10.

In the multi-screen supporting device in the high-temperature adiabatic calorimeter in the present invention, the protecting screens are made of nickel-coated red copper, and each composed of three parts: the lower cover, the sleeve body and the upper cover. The outer protecting screen 2 has an outer diameter of 120-140 mm, height of 190-220 mm and wall thickness of 0.5-1 mm. The middle protecting screen 3 has an outer diameter of 100-120 mm, height of 170-190 mm and wall thickness of 0.5-1 mm. The inner protecting screen 4 has an outer diameter of 80-100 mm, height of 140-160 mm and wall thickness of 0.5-1 mm Through holes with diameter of 15-20 mm are formed in the centers of the bottom covers of the protecting screens 2, 3 and 4.

In the multi-screen supporting device in the high-temperature adiabatic calorimeter in the present invention, the thermal insulation screens are made of nickel-coated red copper, and each composed of three parts: the lower cover, the sleeve body and the upper cover. The outer thermal insulation screen 15 has an outer diameter of 60-80 mm, height of 110-130 mm and wall thickness of 0.4-0.5 mm. The inner thermal insulation screen 16 has an outer diameter of 80-60 mm, height of 80-100 mm and wall thickness of 0.4-0.5 mm A through hole with diameter of 10-8 mm is formed in the center of the bottom cover of the outer thermal insulation screen 15, and a through hole with diameter of 8-6 mm is formed in the center of the bottom cover of the inner thermal insulation screen 16.

In the multi-screen supporting device in the high-temperature adiabatic calorimeter in the present invention, the supporting tube 14 has an outer diameter of 15-20 mm, height of 50-55 mm and wall thickness of 0.5-1 mm. The upper end and the lower end of the supporting tube 14 have threads; the lower end has a sealed thread with a pitch of 1-2 mm and a number of turns of 5-10; and the upper end has an ordinary fine thread with a pitch of 1-3 mm and a number of turns of 5-8. Three stainless steel sleeves have heights of 15-20 mm, wall thicknesses of 0.5-1 mm and inner diameters of 15-20 mm. The third nut 10 has a pitch of 1-3 mm and a height of 2-3 mm.

In the multi-screen supporting device in the high-temperature adiabatic calorimeter in the present invention, the stepped supporting rod 5 is made of alloy or polymer material with high temperature resistance and low thermal conductivity. The lower section of the stepped supporting rod 5 has an outer diameter of 15-20 mm and a height of 10-15 mm. The middle section has an outer diameter of 8-10 mm and a height of 15-25 mm. The upper section has an outer diameter of 6-8 mm and a height of 3-5 mm. The ordinary fine thread is cut on the lower section of the stepped supporting rod 5, and has a pitch of 1-3 mm and a number of turns of 3-5. To reduce the processing difficulty, all the middle sections of the stepped supporting rod 5 have ordinary fine threads with pitch of 1-2 mm. The ordinary fine thread is cut on the upper section, and has a pitch of 1-2 mm and a number of turns of 2-3. The sleeve 7 is made of alloy or polymer material with high temperature resistance and low thermal conductivity, and has an outer diameter of 9-12 mm, wall thickness of 0.5-1 mm and height of 12-22 mm. The first nut 6 has a pitch of 1-2 mm and a height of 2-3 mm. The second nut 8 has a pitch of 1-2 mm and a height of 2-3 mm.

In the multi-screen supporting device in the high-temperature adiabatic calorimeter in the present invention, the connecting piece 9 has a pitch of 2-3 mm and a height of 8-10 mm, and is made of alloy or polymer material with high temperature resistance and low thermal conductivity.

The invention claimed is:
1. A multi-screen supporting device, comprising:
a vacuum tank;
thermal insulation screens disposed within the vacuum tank;
a thermal insulation screen supporter supporting the thermal insulation screens within the vacuum tank, the thermal insulation screen comprising:
 a stepped supporting rod;
 a first nut at a top of the stepped supporting rod
 a second nut at a bottom of the stepped supporting rod; and
 a sleeve sleeved outside the stepped supporting rod between the first nut and the second nut; and
a connecting piece;
protecting screens disposed within the vacuum tank adjacent to the thermal insulation screens;
a protecting screen supporter supporting the protecting screens within the vacuum tank, the protecting screen supporter comprising:
 a third nut;
 a supporting tube, the supporting tube comprising:
  a bottom threaded end having a sealed thread connected with the vacuum tank; and
  an upper threaded end in threaded connection with the connecting piece and the third nut; and
 stainless steel sleeves;
 wherein a first stainless steel sleeve of the stainless steel sleeves is sleeved outside the supporting tube,
 wherein a second stainless steel sleeve of the stainless steel sleeves is sleeved outside the supporting tube,
 wherein a third stainless steel sleeve of the stainless steel sleeves is sleeved outside the supporting tube and positioned at a bottom of the supporting tube, the first stainless steel sleeve being positioned at an upper part of the second stainless steel sleeve and the second stainless steel sleeve being positioned at an upper end of the third stainless steel sleeve;
a lower cover of an outermost one of the protecting screens and a sleeve body penetrating into the third stainless steel sleeve, the outermost one of the protecting screens being supported by the third stainless steel sleeve to limit motion and rotation of the outermost one of the protecting screens along X axis and Y axis and motion along Z axis;
a lower cover of a middle protecting screen and the sleeve body penetrating into the second stainless steel sleeve, the second stainless steel sleeve supporting a middle protecting screen of the protecting screens to limit motion and rotation of the middle protecting screen along X axis and Y axis and motion along Z axis; and
a lower cover of an innermost one of the protecting screens and the sleeve body penetrating into the first stainless steel sleeve, the first stainless steel sleeve supporting the innermost one of the protecting screens to limit motion and rotation of the innermost one of the protecting screens along the X axis and the Y axis and motion along the Z axis;
wherein the outermost one of the protecting screens, the middle protecting screen and the innermost one of the protecting screens,
wherein the bottom of the stepped supporting rod is connected with the upper threaded end of the supporting tube through the connecting piece,
wherein the stepped supporting rod supports an outermost one of the thermal insulation screens with a hole in a bottom cover to limit motion and rotation of the outer thermal insulation screen along the X axis and the Y axis and motion along the Z axis,
wherein the first nut and the stepped supporting rod are in threaded connection to fix the outermost one of the thermal insulation screens,
wherein the upper threaded end of the stepped supporting rod supports an inner most one of the thermal insulation screens with a hole in a bottom cover to limit motion and rotation of the innermost one of the thermal insulation screens along the X axis and the Y axis and motion along the Z axis,
wherein the first nut and the upper threaded end of the stepped supporting rod are in threaded connection to fix the innermost one of the thermal insulation screens,
wherein the sleeve prevents the second nut from rotating when twisting the first nut,
wherein the innermost one of the thermal insulation screens, the outermost one of the thermal insulation screens, the innermost one of the protecting screens, the middle protecting screen and the outermost one of the protecting screens are distributed successively from an inside of the vacuum tank toward ante outside of the vacuum tank, and wherein upper covers of the innermost one of the thermal insulation screens, the outermost one of the thermal insulation screens, the innermost one of the protecting screens, the middle protecting screen and the outermost one of the protecting screens are covered.

* * * * *